United States Patent
Nedorezov et al.

(10) Patent No.: US 8,690,725 B2
(45) Date of Patent: *Apr. 8, 2014

(54) ENGINE RESTART TORQUE SPIKE MANAGEMENT SYSTEM FOR A HYBRID VEHICLE

(75) Inventors: Felix Nedorezov, Rochester Hills, MI (US); Hong Jiang, Birmingham, MI (US); Alexander O'Connor Gibson, Ann Arbor, MI (US); Matthew John Shelton, Grosse Ile, MI (US); Zhengyu Dai, Canton, MI (US); Roger Lyle Huffmaster, Canton, MI (US); Charles Chunlin Liu, Plymouth, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/465,416

(22) Filed: May 7, 2012

(65) Prior Publication Data

US 2013/0296111 A1 Nov. 7, 2013

(51) Int. Cl.
*B60W 10/08* (2006.01)

(52) U.S. Cl.
USPC ............................................................ 477/5

(58) Field of Classification Search
USPC ............................................................ 477/5
See application file for complete search history.

(56) References Cited

U.S. PATENT DOCUMENTS

| | | | |
|---|---|---|---|
| 7,357,754 B2 * | 4/2008 | Roses | 477/143 |
| 7,503,875 B2 | 3/2009 | Fujii et al. | |
| 7,549,944 B2 | 6/2009 | Tabata et al. | |
| 8,038,573 B2 * | 10/2011 | Kozub et al. | 477/5 |
| 8,109,857 B2 * | 2/2012 | Roses et al. | 477/64 |
| 8,123,656 B2 * | 2/2012 | Schoenek et al. | 477/5 |
| 8,167,771 B2 * | 5/2012 | Roses et al. | 477/5 |
| 8,192,324 B2 * | 6/2012 | Kraska et al. | 477/5 |
| 8,224,544 B2 * | 7/2012 | Sah et al. | 701/68 |
| 2010/0318269 A1 | 12/2010 | Yanakiev et al. | |
| 2012/0010044 A1 * | 1/2012 | Gibson et al. | 477/52 |
| 2012/0010045 A1 * | 1/2012 | Nedorezov et al. | 477/79 |
| 2012/0172175 A1 * | 7/2012 | Nedorezov et al. | 477/169 |
| 2013/0085035 A1 * | 4/2013 | Gibson et al. | 477/99 |
| 2013/0116088 A1 * | 5/2013 | Gibson et al. | 477/80 |

* cited by examiner

*Primary Examiner* — Dirk Wright
(74) *Attorney, Agent, or Firm* — James Dottavio; Brooks Kushman P.C.

(57) ABSTRACT

A method for controlling a hybrid vehicle having a traction motor between an engine and a step ratio automatic transmission during a startup of the hybrid vehicle. The method includes performing at least one of adjusting a clutch or an oil pressure to change a transmission tie-up force or downshifting the transmission in response to an actuation rate of a vehicle driver demand.

20 Claims, 1 Drawing Sheet

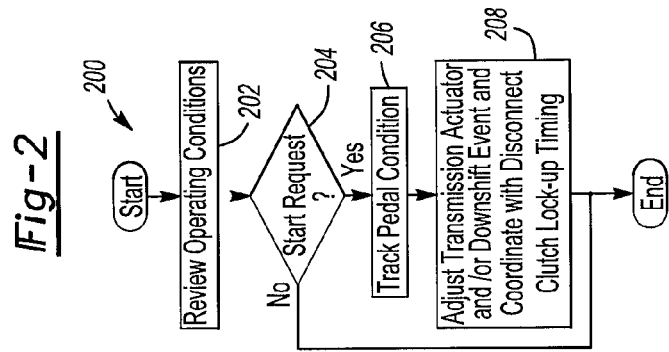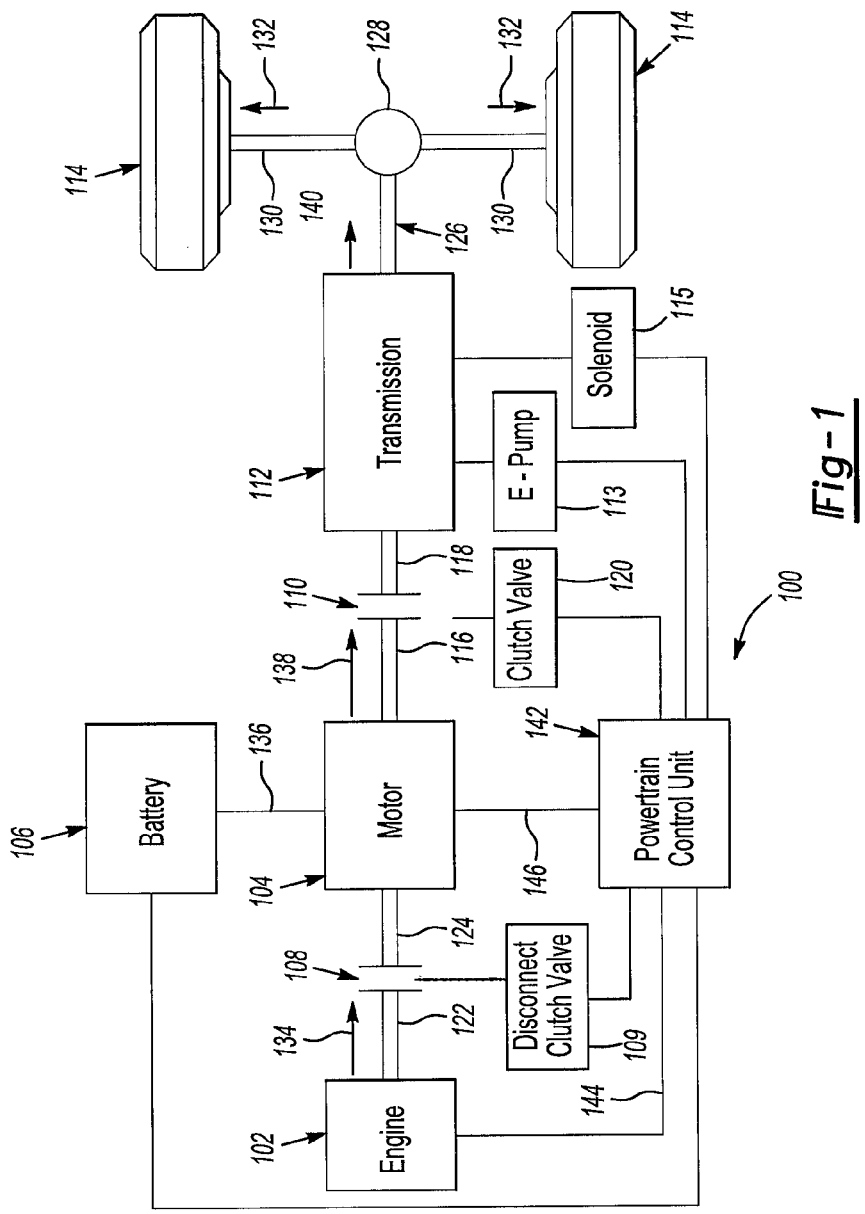

ENGINE RESTART TORQUE SPIKE MANAGEMENT SYSTEM FOR A HYBRID VEHICLE

TECHNICAL FIELD

The present invention relates to an engine restart torque spike management system for a hybrid vehicle.

BACKGROUND

A hybrid vehicle powertrain includes an engine and an electric motor. Torque, which is produced by the engine and/or by the motor, may be transferred to the vehicle drive wheels through a transmission. A traction battery connected to the motor supplies energy to the motor for the motor to produce motor torque. The motor may provide a negative motor torque to the transmission (for example, during regenerative braking). Under such conditions, the motor acts as a generator to the battery.

A hybrid vehicle may have a parallel configuration, a series configuration, or combination thereof. In a parallel configuration (i.e., a modular hybrid transmission ("MHT") configuration), the engine is connectable to the motor by a disconnect clutch and the motor is connected to the transmission. The motor may be connected to the transmission via a torque converter having a torque converter clutch. The engine, the disconnect clutch, the motor, the torque converter, and the transmission are connected sequentially in series.

SUMMARY

Embodiments of the present invention are directed to a controller and a control strategy for a hybrid electric vehicle having an engine, an electric motor, a torque converter with a torque converter clutch, and a transmission. The controller and the control strategy manage an engine restart torque spike during start up by adjusting a transmission tie-up force and/or downshifting the transmission in response to a rate of actuation of an actuator causing the start up. Further, the performing step can be coordinated and timed based on the timing and rate of application of a disconnect clutch.

Advantageously, the controller and the control strategy can be utilized as a mechanism to mitigate engine restart torque spike. It should be understood the start up may refer to engine start up or electrical motor start up. Under certain conditions, it may be desirable to automatically start and stop a vehicle. Stopping the engine can reduce fuel consumption, especially when the vehicle is stopped for longer periods of time, in stop-and-go traffic for example. However, supplying the driver with a desired amount of wheel torque shortly after restart may be difficult because of torque management within a transmission. For example, if transmission clutches are in an open state during start up, a wheel torque response delay may be perceived by the driver. Also, when the engine restarts because of medium to high gas pedal actuation, a disconnect clutch is applied as quickly as possible. Under such conditions, when the engine restarts, torque spike is generated because the manifold is at atmospheric pressure and any engine speed spike is multiplied by the torque converter and by the transmission gear ratio.

In a typical scenario, in the case of heavy tip-in, such as heavy application of the acceleration pedal, the disconnect clutch is connected quickly to provide maximum torque as smoothly as possible. However, by connecting the disconnect clutch quickly, powertrain disturbances are caused because engine torque spikes during an engine restart and the motor speed may not match the engine speed, particularly if the electric machine is used to start the engine. In order to reduce disturbances, ramping of the disconnect clutch can be used until the engine speed substantially equals the electrical motor speed, and then quickly locking the clutch.

Approaches have been advised to mitigate this torque spike. As described above, the disconnect clutch application is delayed or slowed. However, under these conditions, delayed and/or less than uniform launch may result. As a second approach, a transmission tie-up force can be adjusted with the use of a higher gear combination in combination with a rapid lock up of the disconnect clutch. This approach is disclosed in US 2012/0010045, which is incorporated by reference herein in its entirety.

In contrast to the typical operation occurring as set forth above, a controller and the control strategy in accordance with embodiments of the present invention coordinate a transmission tie-up force event and a downshift event with the disconnect clutch lock-up event to allow the torque capacity of the disconnect clutch to increase to ensure a smooth drive away event. If the input is a light pedal, then a slow ramp of the disconnect clutch is applied. As a result, the transmission tie-up force is dropped quickly because the torque spike is mitigated by the disconnect clutch. If the input is a medium to high pedal, then a fast ramp of the disconnect clutch is applied. As a result, the transmission tie-up force application is delayed to absorb the initial torque spike and provide a monotonic torque rise. This control strategy can be advantageously used to minimize engine control spike during relatively high restart engine speeds, such as a restart due to battery state of charge, when the driver does not expect any torque to be delivered to the wheels.

In an embodiment, a method is provided. The method includes stopping a vehicle, and during a vehicle start, performing at least one of adjusting a transmission tie-up force or downshifting a transmission in response to a rate of actuation of an actuator causing the vehicle start.

In an embodiment, a system is provided. The system includes a controller configured to stop a vehicle, and during a vehicle start, perform at least one of adjusting a transmission tie-up force or downshifting a transmission in response to a rate of actuation of an actuator causing the vehicle start.

In an embodiment, a hybrid electric vehicle is provided. The vehicle includes an engine, an electric motor, a torque converter having a bypass clutch, a transmission, and a controller. The controller is configured to stop a vehicle, and during a vehicle start, perform at least one of adjusting a transmission tie-up force or downshifting a transmission in response to a rate of actuation of an actuator causing the vehicle start.

Additional objects, features, and advantages of embodiments of the present invention will become more readily apparent from the following detailed description when taken in conjunction with the drawings, wherein like reference numerals refer to corresponding parts.

BRIEF DESCRIPTION OF THE DRAWINGS

FIG. 1 illustrates a block diagram of an exemplary hybrid vehicle powertrain in accordance with an embodiment of the present invention;

FIG. 2 illustrates a flowchart describing operation of a control strategy for controlling the motor to manage engine restart torque spike with an embodiment of the present invention.

DETAILED DESCRIPTION

Detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Referring now to FIG. 1, a block diagram of an exemplary powertrain system 100 for a hybrid electric vehicle in accordance with one or more embodiments is shown. Powertrain system 100 includes an engine 102, an electric machine such as an electric motor and generator 104 (otherwise referred to as a "motor"), a traction battery 106, a disconnect clutch 108, a torque converter 110, and a multiple-ratio automatic transmission 112.

Engine 102 and motor 104 are drive sources for the vehicle. Engine 102 is connectable to motor 104 through a disconnect clutch 108 whereby engine 102 and motor 104 are connected in series. Motor 104 is connected to torque converter 110. Torque converter 110 is connected to engine 102 via motor 104 when engine 102 is connected to motor 104 via disconnect clutch 108. The disconnect clutch 108 is controllable through disconnect clutch valve 109, which is connected to powertrain control unit 142. Transmission 112 is connected to the drive wheels 114 of the vehicle. The driving force applied from engine 102 and/or motor 104 is transmitted through torque converter 110 and transmission 112 to drive wheels 114 thereby propelling the vehicle.

Torque converter 110 includes an impeller rotor fixed to output shaft 116 of motor 104 and a turbine rotor fixed to the input shaft 118 of transmission 112. The turbine of torque converter 110 can be driven hydro-dynamically by the impeller of torque converter 110. Thus, torque converter 110 may provide a "hydraulic coupling" between output shaft 116 of motor 104 and the input shaft 118 of transmission 112.

Torque converter 110 further includes a torque converter clutch (e.g., a bypass clutch). The torque converter clutch is controllable across a range between an engaged position (e.g., a lock-up position, an applied position, etc.) and a disengaged position (e.g. an unlocked position, etc.). In the engaged position, the converter clutch mechanically connects the impeller and the turbine of torque converter 110 thereby discounting the hydraulic coupling between these components. In the disengaged position, the converter clutch permits the hydraulic coupling between the impeller and the turbine of torque converter 110.

When the torque converter clutch is disengaged, the hydraulic coupling between the impeller and the turbine of torque converter 110 absorbs and attenuates unacceptable vibrations and other disturbances in the powertrain. The source of such disturbances includes the engine torque applied from engine 102 for propelling the vehicle. However, fuel economy of the vehicle is reduced when the converter clutch is disengaged. Thus, it is desired that the converter clutch be engaged when possible.

The torque converter clutch may be controlled through operation of a clutch valve 120. In response to a control signal, clutch valve 120 pressurizes and vents the converter clutch to engage and disengage. The operation of torque converter 110 can be controlled such that converter clutch is neither fully engaged nor fully disengaged and instead is modulated to produce a variable magnitude of slip in torque converter 110. The slip of torque converter 110 corresponds to the difference in the speeds of the impeller and the turbine of torque converter 110. The slip of torque converter 110 approaches zero as converter clutch approaches the fully engaged position. Conversely, the magnitude of the slip of torque converter 110 becomes larger as the converter clutch moves toward the disengaged position.

When operated to produce a variable magnitude of slip, torque converter 110 can be used to absorb vibrations (for example, when gear ratio changes are being made, when the driver releases pressure from the accelerator pedal, etc.) by increasing the slip, thus causing a greater portion of the engine torque to be passed from the impeller to the turbine of torque converter 110 through hydro-dynamic action. When chance of objectionable vibration and disturbance is absent, the converter clutch can be more fully engaged so that fuel economy is enhanced. However, again, as noted above, it is desired that the converter clutch be engaged when possible as the fuel economy of the vehicle is increased when the converter clutch is engaged.

As indicated above, engine 102 is connectable to motor 104 through disconnect clutch 108. In particular, engine 102 has an engine shaft 122 connectable to an input shaft 124 of motor 104 through disconnect clutch 108. As further indicated above, output shaft 116 of motor 104 is connected to the impeller of torque converter 110. The turbine of torque converter 110 is connected to the input shaft of transmission 112.

Transmission 112 includes multiple gear clutches that may be engaged as needed to activate a plurality of fixed transmission gear ratios. Transmission 112 includes an output shaft 126 that is connected to a differential 128. Drive wheels 114 are connected to differential 128 through respective axles 130. With this arrangement, transmission 112 transmits a powertrain output torque 132 to drive wheels 114. The transmission 112 is controllable through one or more solenoids 115, which are connected to powertrain control unit 142.

Engine 102 is a primary source of power for powertrain system 100. Engine 102 is an internal combustion engine such as a gasoline, diesel, or natural gas powered engine. Engine 102 generates an engine torque 134 that is supplied to motor 104 when engine 102 and motor 104 are connected via disconnect clutch 108. To drive the vehicle with engine 102, at least a portion of engine torque 134 passes from engine 102 through disconnect clutch 108 to motor 104 and then from motor 104 through torque converter 110 to transmission 112.

Traction battery 106 is a secondary source of power for powertrain system 100. Motor 104 is linked to battery 106 through wiring 136. Depending on the particular operating mode of the vehicle, motor 124 either converts electric energy stored in battery 106 into a motor torque 138 or sends power to battery 106 through wiring 136. To drive the vehicle with motor 104, motor torque 138 is also sent through torque converter 110 to transmission 112. When generating electrical power for storage in battery 106, motor 104 obtains power either from engine 102 in a driving mode or from the inertia in the vehicle as motor 104 acts as a brake in what is referred to as a regenerative braking mode.

As described, engine 102, disconnect clutch 108, motor 104, torque converter 110, and transmission 112 are connectable sequentially in series as illustrated in FIG. 1. As such, powertrain system 100 represents a parallel or modular hybrid transmission ("MHT") configuration in which engine 102 is connected to motor 104 by disconnect clutch 108 with motor 104 being connected to transmission 112 through torque converter 110.

Depending on whether disconnect clutch 108 is engaged or disengaged determines which input torques 134 and 138 are transferred to transmission 112. For example, if disconnect clutch 108 is disengaged, then only motor torque 138 is supplied to transmission 112. If disconnect clutch is engaged, then both engine torque 134 and motor torque 138 are supplied to transmission 112. Of course, if only engine torque 134 is desired for transmission 112, disconnect clutch 108 is engaged, but motor 104 is not energized such that engine torque 134 is only supplied to transmission 112.

Transmission 112 includes planetary gear sets (not shown) that are selectively placed in different gear ratios by selective engagement of friction elements (not shown) in order to establish the desired multiple drive ratios. The friction elements are controllable through a shift schedule that connects and disconnects certain elements of the planetary gear sets to control the ratio between the transmission output and the transmission input. Transmission 112 is automatically shifted from one ratio to another based on the needs of the vehicle. Transmission 112 then provides powertrain output torque 140 to output shaft 126 which ultimately drives drive wheels 114. The kinetic details of transmission 112 can be established by a wide range of transmission arrangements. Transmission 112 is an example of a transmission arrangement for use with embodiments of the present invention. Any multiple ratio transmission that accepts input torque(s) from an engine and/or a motor and then provides torque to an output shaft at the different ratios is acceptable for use with embodiments of the present invention.

A mechanical pump (not shown) or an electric pump 113 can be utilized to pump transmission fluid into transmission 112. If the torque converter clutch is applied, then electric pump 113 is utilized to provide transmission fluid because the input shaft would not rotate, and therefore, the mechanical pump may not be operational.

Powertrain system 100 further includes a powertrain control unit 142. Control unit 142 constitutes a vehicle system controller. Based on repositioning an accelerator pedal, the driver of the vehicle provides a total drive command when the driver wants to propel the vehicle. The more the driver depresses pedal, the more drive command is requested. Conversely, the less the driver depresses pedal, the less drive command is requested. When the driver releases the pedal, the vehicle begins to coast.

Control unit 142 apportions the total drive command between an engine torque signal (which represents the amount of engine torque 134 to be provided from engine 102 to transmission 112) and a motor torque signal 146 (which represents the amount of motor torque 138 to be provided from motor 104 to transmission 112). In turn, engine 102 generates engine torque 134 and motor generates motor torque 138 for transmission 112 in order to propel the vehicle. Such engine torque 134 and motor torque 138 for propelling the vehicle are "positive" torques. However, both engine 102 and motor 104 may generate "negative" torques for transmission 112 in order to brake the vehicle.

Control unit 142 is further configured to control clutch valve 120 in order to control operation of the torque converter clutch of torque converter 110. Control unit 142 controls the operation of torque converter 110 such that the converter clutch is modulated across a range between the engaged and disengaged positions to produce a variable magnitude of slip in torque converter 110. Again, the slip of torque converter 110 corresponds to the difference between the input rotational speed and the output rotational speed of torque converter 110. The output rotational speed approaches the input rotational speed as the converter clutch approaches the engaged position such that the slip is zero when the converter clutch is in the fully engaged position. Conversely, the output rotational speed lags the input rotational speed as the converter clutch approaches the disengaged position such that the magnitude of the slip becomes larger. A rotation sensor is configured to sense the slip of torque converter 110 and provide information indicative of the slip to control unit 142.

Referring now to FIG. 2, with continual reference to FIG. 1, a flowchart 200 describing operation of a control strategy for mitigating engine restart torque spike during engine restart in accordance with an embodiment of the present invention is shown.

At block 202, operating conditions are determined. Non-limiting examples of operating conditions include engine conditions, ambient conditions, torque converter input speed, torque converter output speed, vehicle brake pressure, transmission oil temperature and pressure, and fuel type. After block 202, the flowchart proceeds to block 204.

At block 204, the flowchart resolves whether or not a start request has been made after a vehicle stop. A start may be an engine restart or a motor restart. An engine start request may be made by a driver's act. Non-limiting examples of a driver's act are changing the position of an actuator such as a brake pedal or accelerator pedal. The start request may also be made by a controller that automatically requests an engine start in response to vehicle operating conditions.

At block 206, a pedal condition is tracked. The pedal condition can describe the user's actuation of an actuator such as a brake pedal or accelerator pedal, and the rate of such actuation. Non-limiting examples of pedal conditions are light pedal, medium pedal and heavy pedal. The rate of actuation of the pedal increases from light to medium to heavy. After tracking the pedal condition, then the flowchart 200 moves onto block 208.

At block 208, an adjustment is made to a tie-up force applied to the transmission and/or a downshift event is applied. One or both actions are made in response to the rate of actuation of the start-up actuator. A transmission actuator such as a transmission clutch or a transmission pressure control valve can be actuated to adjust (e.g., reduce) the tie-up force applied to the transmission. For example, the force applied by a gear clutch may be reduced to reduce the transmission tie-up force. By reducing the transmission tie-up force some of the torque input to the transmission may be directed to the transmission output and vehicle wheels. In one or more embodiments, while the force applied to transmission tie-up clutches is being reduced, the transmission remains tied up. Regarding the downshift event, a non-synchronous downshift can be utilized using a single clutch as a control unit, such as a 3 to 1 or 4 to 1 in a 6 speed transmission. This allows a reduction in the torque spike by the gear ratio. For example, 3 to 1 is a factor of 2.

As described above, a controller and the control strategy in accordance with embodiments of the present invention coordinate a transmission tie-up force event and downshift event with the disconnect clutch lock-up event to allow the torque capacity of the disconnect clutch to increase to ensure a smooth drive away event. If the input is a light pedal, then a slow ramp of the disconnect clutch is applied. As a result, the transmission tie-up force is dropped quickly because the torque spike is mitigated by the disconnect clutch. If the input is a medium to high pedal, then a fast ramp of the disconnect clutch is applied. As a result, the transmission tie-up force application is delayed to absorb the initial torque spike and provide a monotonic torque rise.

Depending on the use case, a different torque mitigation scheme can be used. If an engine restart is generated by the system requirement such as low state of charge of the traction battery, for example, and the driver does not expect any torque, then transmission tie up can be used to mitigate any jerk when the engine starts and the disconnect clutch is connected. If the restart is prompted by a light pedal, then no torque mitigation in the transmission is utilized, but slow ramping of the disconnect clutch is utilized because the driver expects slow launch. If the restart is prompted by a heavy tip-in, then a downshift with a slipping tie-up is utilized as described above. If the restart is wide open pedal, then a downshift is utilized so that partial torque is delivered to the driving wheels and the vehicle starts moving right away but the disconnect clutch apply is masked by the initial lower gear ratio.

While exemplary embodiments are described above, it is not intended that these embodiments describe all possible forms of the present invention. Rather, the words used in the specification are words of description rather than limitation, and it is understood that various changes may be made without departing from the spirit and scope of the present invention. Additionally, the features of various implementing embodiments may be combined to form further embodiments of the present invention.

What is claimed is:

1. A method for controlling a hybrid vehicle having a traction motor between an engine and a step ratio automatic transmission during a startup of the hybrid vehicle comprising:
performing at least one of (1) adjusting a clutch or an oil pressure to change a transmission tie-up force or (2) downshifting the transmission in response to an actuation rate of a vehicle driver demand.

2. The method of claim 1, wherein:
the vehicle start is an engine start or motor start, and the vehicle start is user or system initiated.

3. The method of claim 2, wherein:
the performing step includes adjusting the clutch or the oil pressure for changing the transmission tie-up force based on the vehicle start being system initiated.

4. The method of claim 1, further comprising:
applying a disconnect clutch in response to the actuation rate.

5. The method of claim 4, further comprising:
coordinating the performing step and the applying step to reduce a torque spike during the vehicle startup.

6. The method of claim 1, wherein:
the adjusting step is carried out by an actuator.

7. The method of claim 6, wherein:
the actuator is a clutch.

8. The method of claim 7, wherein:
the clutch is a torque converter lock up clutch.

9. The method of claim 1, wherein:
the downshifting step includes a non-synchronous downshifting event.

10. The method of claim 1, wherein:
the performing step includes both the clutch or the oil pressure for changing transmission tie-up force and downshifting the transmission in response to the actuation rate.

11. A system for controlling a hybrid electric vehicle having a traction motor disposed between an engine and a transmission comprising:
a controller configured to perform at least one of (1) adjusting a clutch or an oil pressure to change a transmission tie-up force or (2) downshifting the transmission in response to an actuation rate of a vehicle driver demand during a startup.

12. The system of claim 11 wherein:
the vehicle start is an engine start or motor start, and the vehicle start is user or system initiated.

13. The system of claim 11 wherein:
the controller is further configured to adjust the clutch or the oil pressure for changing transmission tie-up force based on the vehicle start being system initiated.

14. The system of claim 11 wherein:
the controller is further configured to apply the disconnect clutch in response to the actuation rate.

15. The system of claim 14 wherein:
the controller is further configured to coordinate the performing step and the applying step to reduce a torque spike during the engine start.

16. A hybrid electric vehicle comprising:
an engine;
an electric traction motor selectively coupled to the engine by a clutch;
a torque converter;
a transmission; and
a controller configured to perform at least one of (1) adjusting the clutch or an oil pressure to change a transmission tie-up force or (2) downshifting the transmission in response to an actuation rate of a vehicle driver demand during a startup.

17. The system of claim 16 wherein:
the vehicle start is an engine start or motor start, and the vehicle start is user or system initiated.

18. The system of claim 16 wherein:
the controller is further configured to adjust the clutch or the oil pressure to change the transmission tie-up force based on the vehicle start being system initiated.

19. The system of claim 16 wherein:
the controller is further configured to apply the disconnect clutch in response to the actuation rate.

20. The system of claim 19 wherein:
the controller is further configured to coordinate the performing step and the applying step to reduce a torque spike during the engine start.

* * * * *